US012560283B2

(12) United States Patent
Koch et al.

(10) Patent No.: US 12,560,283 B2
(45) Date of Patent: Feb. 24, 2026

(54) METHOD AND SYSTEM FOR FILLING FLUID CONTAINERS

(71) Applicant: EDAG Engineering GmbH, Wiesbaden (DE)

(72) Inventors: Marius Koch, Euskirchen (DE); Florian Jarmer, Stuhr (DE)

(73) Assignee: EDAG ENGINEERING GMBH, Wiesbaden (DE)

( * ) Notice: Subject to any disclaimer, the term of this patent is extended or adjusted under 35 U.S.C. 154(b) by 41 days.

(21) Appl. No.: 18/573,423

(22) PCT Filed: Jun. 30, 2022

(86) PCT No.: PCT/EP2022/068008
§ 371 (c)(1),
(2) Date: Dec. 21, 2023

(87) PCT Pub. No.: WO2023/275216
PCT Pub. Date: Jan. 5, 2023

(65) Prior Publication Data
US 2024/0288123 A1 Aug. 29, 2024

(30) Foreign Application Priority Data
Jun. 30, 2021 (DE) ......................... 102021206794.8

(51) Int. Cl.
*F17C 5/00* (2006.01)
*F17C 5/06* (2006.01)

(52) U.S. Cl.
CPC ................ *F17C 5/007* (2013.01); *F17C 5/06* (2013.01); *F17C 2203/0604* (2013.01);
(Continued)

(58) Field of Classification Search
CPC ...... F17C 5/06; F17C 5/002; F17C 2221/012; F17C 2221/0157; F17C 2227/048
See application file for complete search history.

(56) References Cited

U.S. PATENT DOCUMENTS

2001/0037838 A1 11/2001 Hasenkopf
2018/0016430 A1 * 1/2018 Shibutani ................ B32B 27/08
2024/0003489 A1 * 1/2024 Fernandes ................. F17C 1/00

FOREIGN PATENT DOCUMENTS

DE 102010044035 A1 5/2012
DE 102010044035 B4 5/2013
(Continued)

OTHER PUBLICATIONS

Decision to Grant a Patent for Japanese Patent Application Serial No. 2022-520317 (Sep. 28, 2023).
(Continued)

*Primary Examiner* — Timothy L Maust
(74) *Attorney, Agent, or Firm* — Jenkins, Taylor & Hunt, P.A.

(57) ABSTRACT

The subject matter described herein relates to a method for filling fluid containers, in particular fluid containers for fuel cells The method includes: providing a pressure chamber having a pressure chamber interior; positioning a fluid container within the pressure chamber interior in such a manner that a holding space of the fluid container is fluidically connected to the pressure chamber interior; evacuating the pressure chamber interior up to a target negative pressure in such a manner that, due to the fluid coupling, a negative pressure difference initially forms in the pressure chamber interior with respect to the holding space; and filling the fluid container by introducing a fluid into the holding space.

15 Claims, 2 Drawing Sheets

(52) U.S. Cl.
CPC ................. *F17C 2205/0111* (2013.01); *F17C 2205/0323* (2013.01); *F17C 2221/012* (2013.01); *F17C 2227/0157* (2013.01); *F17C 2227/045* (2013.01)

(56) References Cited

FOREIGN PATENT DOCUMENTS

| | | | |
|---|---|---|---|
| DE | 10 2019 202 894 | A1 | 9/2020 |
| EP | 1 073 531 | B1 | 4/1999 |
| JP | 2007-205470 | A | 8/2007 |
| KR | 2021/0041711 | A | 4/2021 |
| WO | WO 2007/072470 | A1 | 6/2007 |

OTHER PUBLICATIONS

Notice of Reasons for Refusal for Japanese Patent Application Serial No. 2022-520317 (Mar. 30, 2023).

Office Action for German Patent Application No. 10 2021 206 794.8 (Mar. 22, 2022).

Notification of the Transmittal of the International Search Report and the Written Opinion of the International Searching Authority for International Application No. PCT/EP2022/068008 (Oct. 27, 2023).

Notice of Reasons for Rejection for Japanese Patent Application Serial No. 2023-579095 (Mar. 18, 2025).

Office Action for Canadian Patent Application Serial No. 3,222,467 (Apr. 23, 2025).

Office Action for Korean Patent Application Serial No. 1020247002915 (Sep. 1, 2025).

Office Action for European Patent Application Serial No. 22741216.0 (Jun. 20, 2025).

Office Action for Chinese Patent Application Serial No. 202280046637.7 (Oct. 29, 2025).

* cited by examiner

METHOD AND SYSTEM FOR FILLING FLUID CONTAINERS

CROSS-REFERENCE TO RELATED APPLICATIONS

This application is a U.S. National Phase Application of PCT International Patent Application No. PCT/EP2022/068008, filed Jun. 30, 2022, which claims priority to the German Patent Application Serial No. 102021206794.8, filed Jun. 30, 2021, the disclosure of each of which is incorporated herein by reference in its entirety.

FIELD OF THE INVENTION

The present invention relates to a method for filling fluid containers, in particular fluid containers for operating hydrogen-operated fuel cells, and also to a system for filling fluid containers for operating hydrogen-operated fuel cells.

TECHNICAL BACKGROUND

A fuel cell is a galvanic cell that converts the chemical reaction energy of a continuously supplied fuel and an oxidizing agent into electrical energy. Fuel cells are therefore not energy storage devices, but rather energy converters to which a fuel (energy in chemically bound form) is supplied. However, a complete fuel cell system may also contain a fuel storage device. Such fuel cells are generally known and therefore require no further explanation.

When operating such a fuel cell, the chemically bound energy of a fuel is converted directly into electricity. In conventional fuel cells, hydrogen is used inter alia as the reaction gas. In this case, the chemical purity or concentration of the hydrogen is decisive and, accordingly, the manufacturers of fuel cells set strict specifications for the purity or concentration of the hydrogen. In order to achieve these specifications, a vacuum is usually initially generated in the hydrogen containers so that gas contained therein escapes before the hydrogen containers are filled with hydrogen from a hydrogen tank system.

For weight reasons, modern hydrogen containers are usually made of composite materials and contain an inner wall layer of synthetic material as the core, in particular of polyamide or polyethylene, the so-called inner liner, which prevents diffusion of the hydrogen through the container. Due to this structure, lightweight containers, in particular lightweight containers made of composite materials, cannot be placed under a vacuum without becoming damaged, since their inner liners, which are intended to comply with the prescribed permeation limits, would collapse and become damaged. For these reasons, a so-called alternating pressure flushing method is often used in these non-vacuum-capable containers. In the alternating pressure flushing method, gaseous nitrogen is forced into a closed container in order to displace the oxygen in the container. Subsequently, hydrogen is alternately filled, and the resulting mixture is emptied into the atmosphere. During blow-off, the gas that is previously contained in the container initially escapes. The process having the steps of closing—blowing in—opening—blowing out is continued until the desired concentration is achieved.

However, the alternating pressure flushing method has very long process times due to the multiple instances of completely filling and emptying of the tank systems with hydrogen. Furthermore, this is associated with a high gas consumption since the gas that is used is contaminated as a result of the introduction of nitrogen and therefore cannot be recycled or reused.

SUMMARY OF THE INVENTION

Against this background, one of the ideas of the present invention is to provide an improved method, in particular a method that saves resources.

In accordance with a first aspect of the present invention, a method is provided for filling fluid containers, in particular fluid containers for operating hydrogen-operated fuel cells. The method in accordance with the invention comprises the following steps. Providing a pressure chamber having a pressure chamber interior. Positioning a fluid container within the pressure chamber interior in such a manner that a holding space of the fluid container is fluidically connected to the pressure chamber interior. Evacuating the pressure chamber interior up to a target negative pressure in such a manner that, due to the fluid coupling, a negative pressure difference initially forms in the pressure chamber interior with respect to the holding space. Filling the fluid container by introducing a fluid into the holding space.

In accordance with a second aspect of the present invention, a system is provided for filling fluid containers for operating hydrogen-operated fuel cells, in particular for implementing a method in accordance with the invention. The system in accordance with the invention comprises a pressure chamber having a pressure chamber interior that is embodied as fluid-tight, as well as a fluid container, which is positioned within the pressure chamber interior, and the holding space of said fluid container can be fluidically connected to the pressure chamber interior. The system in accordance with the invention further comprises a compressor device, which is embodied so as to generate a negative pressure difference in the pressure chamber interior with respect to the holding space; wherein the system is embodied so as to implement a method in accordance with the invention.

One idea on which the present invention is based is to create a controlled compact atmosphere in which fluid containers are positioned, in which the pressure can be controlled in a purposeful manner and a pressure difference is set between the outside and the inside of the fluid containers. This pressure difference is set in such a manner that damage to the inner liner of the fluid containers is prevented. Advantageously, a fluid container is initially evacuated in that a negative pressure difference or a negative pressure with respect to the holding space of the fluid container is generated in a space that surrounds the fluid container, so that a fluid that is located in the holding space flows out into the space. In this case, a negative pressure difference can also be generated in the pressure chamber in comparison with an ambient atmosphere that surrounds the pressure chamber. Subsequently, when the target negative pressure is achieved, at which the holding space comprises a vacuum or contains only a predetermined acceptable residual material, the holding space of the fluid container is filled with any fluid that is not contaminated as a result of the fluid that is previously contained in the holding space. The space that surrounds the fluid container is embodied in accordance with the invention as a pressure chamber, in other words a closed system having adjustable pressure ratios. The pressure chamber seals the pressure chamber interior hermetically, that is to say in a fluid-tight manner with respect to an environment.

Advantageous embodiments and developments are evident in the further subordinate claims and also in the description with reference to the figures in the drawing.

In accordance with one embodiment of the method, the fluid container has an inner liner, which is embodied so as to seal the holding space of the fluid container in a gas-tight manner with respect to the outside. The inner liner corresponds to the inner layer of fluid containers that are made of composite materials, in particular composite gas bottles, and forms a thin-walled barrier layer in order to reduce diffusion of gases through the wall of the fluid container. Thus, it is also possible to use materials for fluid containers that are not sufficiently gas-tight due to their material properties or processing forms, but which have other suitable properties. For example, the weight of the fluid container can consequently be reduced or thermal and/or electrical conductivities can be promoted or reduced. In addition, the inner liner can carry a valve.

In accordance with a further embodiment, after the evacuation step, the method further comprises the step of switching from an evacuation state, in which a fluidic exchange between the holding space of the fluid container and the pressure chamber interior is permitted, into a filling state, in which a fluidic exchange between the holding space of the fluid container and a fluid tank that is fluidically connected to the holding space is permitted. In this case, it is clear to the person skilled in the art that the fluidic exchange in accordance with the respective other state is prevented in the respective state. That is to say, in the evacuation state, the fluidic exchange between the holding space of the fluid container and the pressure chamber interior is permitted, but not the fluidic exchange between the holding space of the fluid container and the fluid tank. In the filling state, it is accordingly the other way around. In this case, the switching can be automated, in particular by means of the control device, or controlled by a user.

However, the present invention is not limited to the states described above, but can also comprise, for example, a transport state in which the holding space is fluidically closed off from the outside. The switching is performed, for example, by means of a controllable multiport valve, which is fluidically connected to the fluid container.

In accordance with a further embodiment of the method, a fluidic exchange between the holding space of the fluid container and the pressure chamber interior is prevented at least temporarily during the evacuation step, so that the pressure difference between the holding space and the pressure chamber interior temporarily increases. The fluidic exchange can be prevented, for example, by means of a closure element at an outlet of the fluid container. In this way, damage to the inner liner can be prevented by slowing down the pressure change in the holding space or by maintaining a predetermined minimum pressure difference.

In accordance with a further embodiment of the method, the target negative pressure is generated by means of using a compressor device. The compressor device is fluidically coupled to the pressure chamber and is embodied so as to generate a negative pressure difference or a negative pressure in the pressure chamber interior in comparison with the ambient atmosphere that surrounds the pressure chamber. The compressor device is embodied in particular as a vacuum pump. The evacuation can consequently be performed under predetermined parameters and in a more reliable manner with regard to the process.

In accordance with a further embodiment, the method further comprises the step of reducing the negative pressure difference in the pressure chamber interior in comparison with the ambient atmosphere that surrounds the pressure chamber until the pressure in the pressure chamber interior corresponds to the pressure of the ambient atmosphere. In this way, it can be ensured that the pressure increase in the pressure interior takes place in a controlled manner and that devices that are arranged therein are not damaged.

In accordance with one development, the step of reducing the negative pressure difference is performed during the step of filling the fluid container, wherein the pressure in the pressure chamber interior always has at most the pressure in the holding space. The method can consequently be accelerated as a whole, since two steps take place in parallel in terms of time.

In accordance with a further embodiment of the method, the negative pressure difference is compensated for in the evacuation step at the latest when the target negative pressure of at most 0.5 bar abs is achieved. In the case of this target negative pressure, a vacuum, which is suitable in such a manner that the residual material in the holding space does not oppose the desired purity of the subsequently filled fluid, can advantageously be generated in the holding space.

In accordance with a further embodiment, the method is used for an initial filling of the fluid container. In the case of fluid containers that have already been filled with the same fluid beforehand, a residual excess pressure in the fluid container with respect to the ambient atmosphere is usually left so that during refilling no moisture and/or no foreign gases penetrate into the holding space as a result of the residual excess pressure. This is not the case for previously unloaded fluid containers, which is why moisture and/or foreign gases, as a rule air, can be contained in such fluid containers, which must first be reduced during the initial filling.

In accordance with a further embodiment of the method, the fluid contains hydrogen and is introduced into the holding space from a fluid tank that is fluidically connected to the holding space. Hydrogen is used in particular in fuel cells as a reaction gas for generating electrical energy. In this case, the hydrogen is required with a purity of at least 99.9% by volume, in particular of at least 99.99% by volume.

In accordance with a further embodiment of the method, the fluid container is a type IV container. Type IV containers are used in particular for fuel cells. These containers are made of CFRP composite materials, for example, and thus have a lower weight than conventional containers made of steel or light metals.

In accordance with one embodiment of the system, the fluid container has an inner liner, which is embodied so as to seal the holding space of the fluid container in a gas-tight manner with respect to the outside. In this way, the fluid container can be made of a material that is lighter than conventional gas-tight materials but does not have the required permeability and consequently could not seal the holding space in a gas-tight manner without the inner liner.

In accordance with a further embodiment, the system further comprises a fluid tank that can be fluidically connected to the holding space and is embodied so as to introduce a fluid into the holding space. The fluid tank can be arranged either in the pressure chamber interior or outside the pressure chamber. In addition, the fluid tank contains, for example, industrial gases, such as acetylene, argon, hydrocarbons, oxygen, nitrogen, hydrogen or carbon dioxide, compressed air or comparable fluids, it being possible for said fluids to be contained in the fluid tank in the gaseous and/or liquid state of aggregation. The fluid tank can accordingly have an insulation device and/or a cooling device, depending on the suitable storage conditions of the fluid.

In accordance with a development, the system further comprises a controllable multiport valve that is fluidically connected to the fluid container and is embodied so as to switch from an evacuation state, in which a fluidic exchange between the holding space of the fluid container and the pressure chamber interior is permitted, into a filling state, in which a fluidic exchange between the holding space of the fluid container and the fluid tank is permitted. In this case, the multiport valve in the respective state prevents the fluidic exchange in accordance with the respective other state. That is to say, in the evacuation state, the fluidic exchange between the holding space of the fluid container and the pressure chamber interior is permitted while the fluidic exchange between the holding space of the fluid container and the fluid tank is blocked. In the filling state, it is accordingly the other way around. In this case, by way of example the controllable multiport valve can be electronically coupled to the control device.

However, the present invention is not limited to a multiport valve that can only set the states described above. Rather, the multiport valve can also comprise, for example, further settings in which the holding space is fluidically closed off from the outside and/or provided with a pressure sensor.

In addition, the pressure chamber interior is dimensioned, for example, in such a way that persons can enter it through a lockable door and stand upright in it.

In addition, the pressure chamber can optionally have a connection for fluidically connecting the pressure chamber interior to the environment and/or an electronic coupling device, by means of which, for example, devices that are positioned in the pressure chamber interior can be externally controlled/energetically supplied. The pressure chamber can consequently be dimensioned in a compact manner, since in particular supply devices such as a fluid tank, a control device or the like can be provided outside the pressure chamber and can nevertheless be guided into the pressure chamber interior that is closed during operation. Nonetheless, the supply devices mentioned above in an exemplary manner can also be arranged in the pressure chamber interior in each case.

The fluid container can be selectively positioned in the pressure chamber interior either manually, automatically or in a semi-automated manner. For example, one or more fluid containers can be stored on a transport device and can be transported using the transport device into the pressure chamber interior.

If a plurality of fluid containers is arranged in the pressure chamber interior, their holding spaces can in each case be fluidically connected to the pressure chamber interior independently of one another or at least some of them together. The fluid coupling between the holding space and the pressure chamber interior can be provided, for example, via a hose line device, wherein hoses of the hose line device are embodied in particular as dimensionally stable hoses. Alternatively or additionally, the fluid coupling can be provided via a pipeline system. The negative pressure difference or negative pressure in the pressure chamber interior with respect to the holding space causes fluids to flow from the holding space to the pressure chamber interior. Since the holding space has no fluidic inlets, the holding space is evacuated as long as the negative pressure difference remains.

The target negative pressure is measured, for example, by means of a barometer, in particular by a digital barometer, a mercury barometer, a tube barometer or the like. The measured value is selectively displayed either graphically, textually or in mixed forms. In addition, the barometer can be electronically coupled to the control device and can transmit the measured value to the control device so as to monitor/regulate the target negative pressure.

If appropriate, the above embodiments and developments can be combined with one another as desired.

Further possible embodiments, developments and implementations of the invention also include combinations, not explicitly mentioned, of features of the invention described above or below with regard to the exemplary embodiments. In particular, the person skilled in the art will also add individual aspects as improvements or additions to the respective basic form of the present invention.

CONTENTS OF THE DRAWING

The present invention is explained in further detail hereinunder with reference to exemplary embodiments illustrated in the schematic figures of the drawings. In the drawings.

Figure 1:
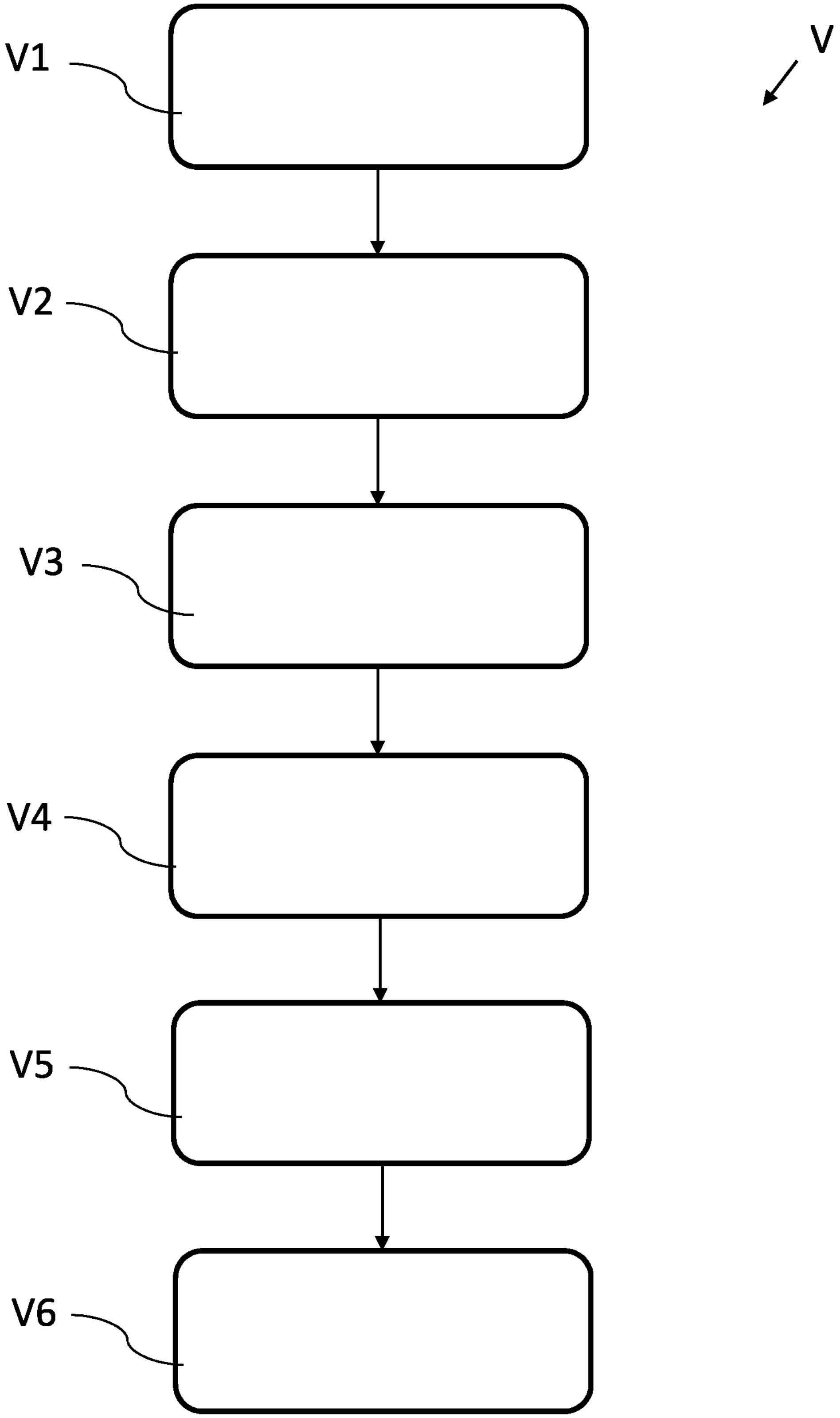
FIG. 1 shows a flowchart of a method for filling fluid containers in accordance with an exemplary embodiment.

The enclosed drawings are intended to provide a further understanding of the embodiments of the invention. They illustrate embodiments and are used in connection with the description of the explanation of principles and concepts of the invention. Other embodiments and many of the advantages that are mentioned arise with regard to the drawings. The elements of the drawings are not necessarily shown true to scale with one another.

In the figures in the drawing, identical, functionally identical and identically acting elements, features and components are in each case provided with the same reference characters, unless stated otherwise.

DESCRIPTION OF EXEMPLARY EMBODIMENTS

The term pressure in the sense of the present invention refers to the absolute pressure, which according to the definition is the pressure with respect to the pressure zero in the empty space/vacuum.

In the context of the present invention, an inner liner is a core of a fluid container, which forms the inner barrier layer of the fluid container, in particular of fluid containers made of composite materials, in order to ensure a certain permeability and to provide the tightness of the fluid container. Materials such as steel, stainless steel, aluminium or plastic are used for this thin-walled barrier layer.

A vacuum in the sense of the present invention is a gas-filled (air-filled) space in which the pressure is lower than the pressure of the ambient atmosphere. The following applies: The fewer atoms there are within a limited space, the purer the vacuum, wherein it is impossible to generate an absolutely pure vacuum on earth with the technical means available to date. Depending on the pressure level, a distinction is made between coarse vacuum, fine vacuum, high vacuum and ultra-high vacuum (maximum vacuum).

FIG. 1 illustrates a flowchart of a method V for filling fluid containers 1. This method V is used, for example, for an initial filling of a fluid container 1.

The fluid container 1 in accordance with the example in FIG. 1 is a so-called type IV container made of composite materials, such as is used, for example, for fuel cells, and has an inner liner. The inner liner is embodied so as to seal the holding space 3 of the fluid container 1 in a gas-tight manner with respect to the outside.

In accordance with the invention, the method V comprises the step of providing V1 a pressure chamber 2 having a pressure chamber interior 4. The pressure chamber 2 essentially corresponds, in an exemplary manner, to a so-called decompression chamber having a closable access door. Optionally, the pressure chamber 2 can also have a plurality of access doors or openings. Such pressure chambers 2 are furthermore embodied so as to be essentially curved in order to be able to advantageously withstand the mechanical loads that are caused as a result of the pressure differences with respect to the ambient atmosphere. However, this does not exclude regions of the pressure chamber 2 that are embodied as straight in sections. In this case, the pressure chamber interior 4 is approximately 2 m to approximately 4 m high and has a base area in the range from 5 $m^2$ to 200 $m^2$, in particular in the range from 10 $m^2$ to 100 $m^2$.

In addition, the method V comprises the step of positioning V2 the fluid container 1 within the pressure chamber interior 4 in such a manner that the holding space 3 of the fluid container 1 is fluidically connected to the pressure chamber interior 4. The fluid container 1 lies, for example, in this case on a transport trolley having rollers. The transport trolley can consequently be conveniently pushed into the pressure chamber interior 4 from the outside, while the fluid container 1 remains on the transport trolley. In addition, a controllable multiport valve 7 is fastened to the fluid container 1 in an exemplary manner.

The method V further comprises the step of evacuating V3 the pressure chamber interior 4 up to a target negative pressure. The evacuation V3 in this case is performed in a manner that due to the fluid coupling, a negative pressure difference initially forms in the pressure chamber interior 4 with respect to the holding space 3. The desired target negative pressure is generated, for example, by means of using a compressor device 6, which is for example embodied as a vacuum pump. In accordance with the example in FIG. 1, the step of evacuation V3 is performed/maintained until the desired target negative pressure of at most 0.5 bar abs, in particular in the range from 0.48 bar abs to 0.4 bar abs, is achieved. When the desired target negative pressure is achieved, the compressor device 6 is throttled in such a manner that the negative pressure difference in the pressure chamber interior 4 with respect to the holding space 3 is compensated again.

Furthermore, for example, at the beginning of the evacuation step V3, a fluidic exchange between the holding space 3 of the fluid container 1 and the pressure chamber interior 4 is not permitted. As a result, in the initial phase of the evacuation step V3, the pressure difference between the holding space 3 and the pressure chamber interior 4 increases. An internal pressure can consequently be applied to the inner liner right at the beginning and, in addition, a leakage test of the inner liner can be performed by measuring and monitoring the internal pressure in the holding space 3.

In addition, after the evacuation step V3, the method V in accordance with FIG. 1 further comprises the optional step of switching V4 from an evacuation state, in which a fluidic exchange between the holding space 3 of the fluid container 1 and the pressure chamber interior 4 is permitted, into a filling state, in which a fluidic exchange between the holding space 3 of the fluid container 1 and a fluid tank 5 that is fluidically connected to the holding space is permitted. For example, a control device controls the switching V4, wherein the control device uses, inter alia, the pressure in the pressure chamber interior 4 and the pressure in the holding space 3 for this purpose. In this case, the control device sends, by way of example, corresponding control signals in a wired and/or wireless manner to the controllable multiport valve 7.

In addition, the method V comprises the step of filling V5 the fluid container 1 by introducing a fluid into the holding space 3. For example, the fluid is hydrogen with a purity of at least 99.99% by volume, which is introduced into the holding space 3, from the fluid tank 5, which is fluidically connected to the holding space 3.

The method V optionally further comprises the step of reducing V6 the negative pressure difference in the pressure chamber interior 4 in comparison with an ambient atmosphere that surrounds the pressure chamber 2 until the pressure in the pressure chamber interior 4 corresponds to the pressure of the ambient atmosphere. In particular, the step of reducing V6 the negative pressure difference is performed during the step of filling V5 the fluid container 1. In this case, the pressure in the pressure chamber interior 4 always comprises at most the pressure in the holding space 3, so that damage to the inner liner is avoided.

Figure 2:
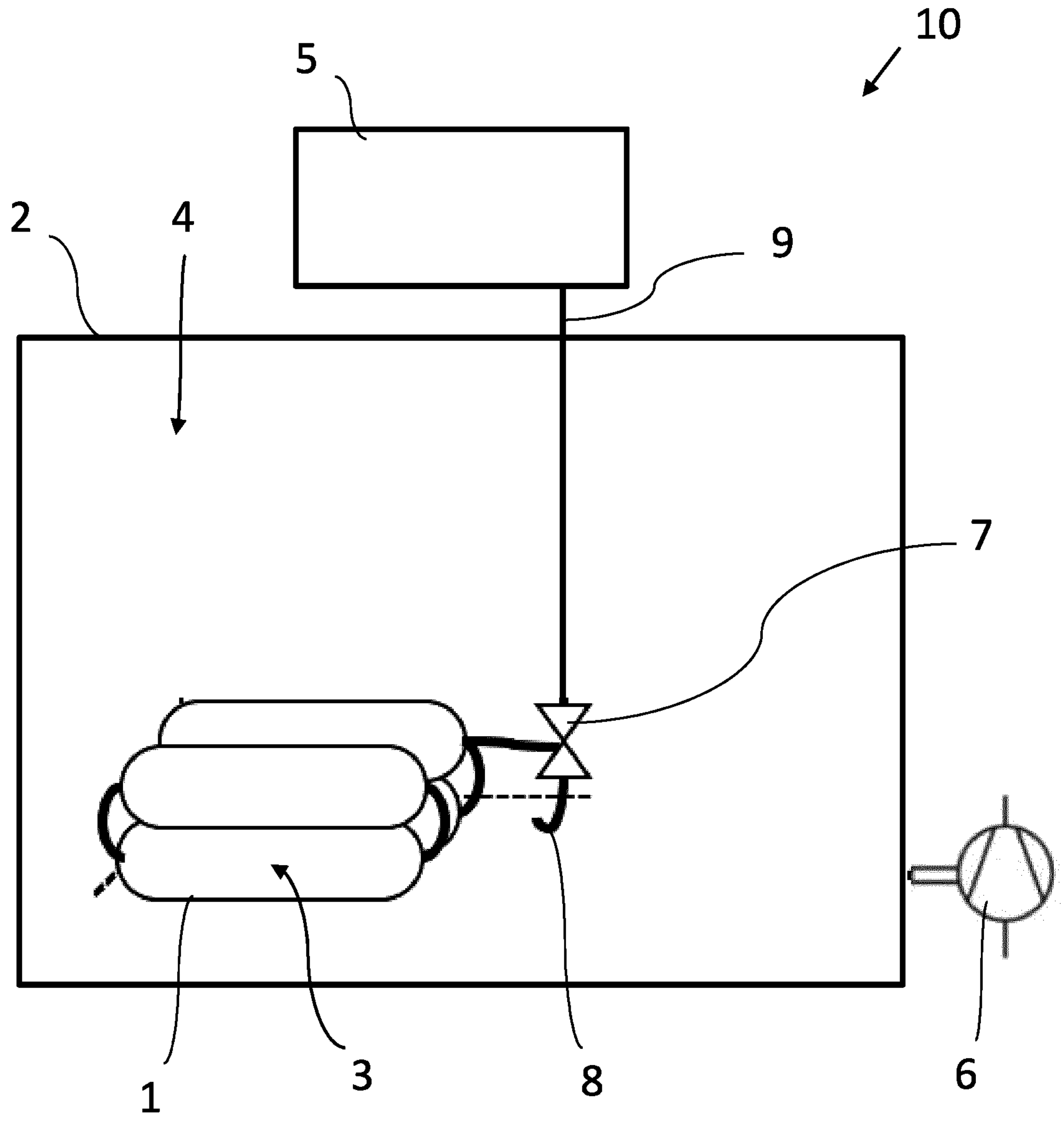
FIG. 2 shows a schematic view of a system for filling fluid containers in accordance with a further exemplary embodiment.

FIG. 2 illustrates in an exemplary manner a schematic view of a system 10 for filling fluid containers 1.

In accordance with the invention, the system 10 has a fluid container 1, a pressure chamber 2 and a compressor device 6. In addition, the system 10 that is illustrated in an exemplary manner contains an optional fluid tank 5 and an optional controllable multiport valve 7.

The pressure chamber 2 comprises a pressure chamber interior 4 that is embodied to be fluid-tight. The pressure chamber 2 is embodied in an exemplary manner as essentially cylindrical. The pressure chamber 2 further has at least one access door. In this case, the pressure chamber interior 4 comprises an inner height of approximately 2 m to approximately 4 m, a base area in the range from 5 $m^2$ to 200 $m^2$, in particular in the range from 10 $m^2$ to 100 $m^2$. The pressure chamber 2 in accordance with the example in FIG. 2 can likewise also be combined with features of the pressure chamber 2 in accordance with the example in FIG. 1.

The fluid container 1 is positioned within the pressure chamber interior 4. In addition, the holding space 3 of the fluid container 1 can be fluidically connected to the pressure chamber interior 4. By way of example, the fluid container 1 has an outlet opening 8, which extends into the pressure chamber interior 4 and can be closed. In the example in FIG. 2, the fluid container 1 is made of a steel or a steel alloy.

The compressor device 6 is arranged, by way of example, outside the pressure chamber 2 and is fluidically coupled to the pressure chamber 2. The compressor device 6 is further embodied so as to generate a negative pressure difference in the pressure chamber interior 4 with respect to the holding space 3. As an alternative or in addition, the compressor device 6 is embodied so as to generate a negative pressure in the pressure chamber interior 4 in comparison with the ambient atmosphere that surrounds the pressure chamber 2.

The fluid tank 5 is arranged, by way of example, outside the pressure chamber 2 and can be fluidically connected to the holding space 2. In this case, the fluid tank 5 is fluidically connected to the holding space 3, by way of example via a hose line device 9, wherein hoses of the hose line device 9 are embodied in particular as a dimensionally stable hose. Alternatively or additionally, the fluid tank 5 can be connected to the holding space 3 via a pipeline system. In addition, the fluid tank 5 is embodied so as to introduce a fluid into the holding space 3.

In FIG. 2, the controllable multiport valve 7 is, by way of example, fluidically connected to a plurality of fluid containers 1 and is able to switch between an evacuation state and a filling state. In the evacuation state, a fluidic exchange between the holding space 3 of the fluid containers 1 and the pressure chamber interior 4 is permitted. In the filling state, a fluidic exchange between the holding space 3 of the fluid containers 1 and the fluid tank 5 is permitted.

By way of example, the fluid is liquid hydrogen, which is stored in the fluid tank 5 at about 200 bar to 300 bar and, in the filling state, the fluid container 1 comprises a direction of flow into the holding space 3 as a result of the pressure difference with respect to the holding space 3.

In accordance with the invention, the system 10 that is illustrated in FIG. 2 is embodied so as to implement the method V in accordance with the example in FIG. 1 or in accordance with a method V that is not described in detail and comprises at least the method features of the present invention.

Although the present invention has been fully described above on the basis of exemplary embodiments, it is not limited thereto, but can be modified in a variety of ways.

LIST OF REFERENCE NUMERALS

1 Fluid container
2 Pressure chamber
3 Holding space
4 Pressure chamber interior
5 Fluid tank
6 Compressor device
7 Multiport valve
8 Outlet opening
9 Hose line device
10 System
V Method
V1 Providing
V2 Positioning
V3 Evacuating
V4 Switching
V5 Filling
V6 Reducing

The invention claimed is:

1. A method for filling fluid containers, the method comprising the steps of:

providing a pressure chamber having a pressure chamber interior;

positioning a fluid container within the pressure chamber interior in such a manner that a holding space of the fluid container is fluidically connected to the pressure chamber interior;

evacuating the pressure chamber interior up to a target negative pressure in such a manner that, due to the fluid coupling, a negative pressure difference initially forms in the pressure chamber interior with respect to the holding space;

switching from an evacuation state into a filling state, in which a fluidic exchange between the holding space of the fluid container and a fluid tank that is fluidically connected to the holding space is permitted; and filling the fluid container by introducing a fluid into the holding space.

2. The method of claim 1, wherein the fluid container comprises an inner liner that is embodied so as to seal the holding space of the fluid container in a gas-tight manner with respect to the outside.

3. The method of claim 1, wherein during the evacuation step, a fluidic exchange between the holding space of the fluid container and the pressure chamber interior is prevented at least temporarily in such a manner that the pressure difference between the holding space and the pressure chamber interior temporarily increases.

4. The method of claim 1, wherein the target negative pressure is generated by means of using a compressor device.

5. The method of claim 1, comprising the further step:

reducing the negative pressure difference in the pressure chamber interior in comparison with an ambient atmosphere that surrounds the pressure chamber until the pressure in the pressure chamber interior corresponds to the pressure of the ambient atmosphere.

6. The method of claim 5, wherein the step of reducing the negative pressure difference is performed during the step of filling the fluid container, wherein the pressure in the pressure chamber interior always comprises at most the pressure in the holding space.

7. The method of claim 1, wherein the negative pressure difference is compensated for in the evacuation step at the latest when the target negative pressure of at most 0.5 bar abs is achieved.

8. The method of claim 1, wherein the method is used for an initial filling of the fluid container.

9. The method of claim 1, wherein the fluid contains hydrogen and is introduced into the holding space, from a fluid tank which is fluidically connected to the holding space.

10. The method of claim 1, wherein the fluid container is a type IV container.

11. The method of claim 1, wherein the method is configured for filling fluid containers for operating hydrogen-operated fuel cells.

12. The method of claim 9, wherein the fluid consists of highly pure hydrogen.

13. A system for filling fluid containers, the system comprising:

a pressure chamber that comprises a fluid-tight pressure chamber interior;

a fluid container, which is positioned within the pressure chamber interior, and a holding space of which is fluidically connected to the pressure chamber interior;

a compressor device that is embodied so as to generate a negative pressure difference in the pressure chamber interior with respect to the holding space;

a fluid tank, which is fluidically connected to the holding space in order to introduce a fluid into the holding space; and a controllable multiport valve that is fluidically connected to the fluid container and is embodied so as to switch from an evacuation state into a filling state, in which a fluidic exchange between the holding space of the fluid container and the fluid tank is permitted.

14. The system of claim 13, wherein the fluid container comprises an inner liner that is embodied so as to seal the holding space of the fluid container in a gas-tight manner with respect to the outside.

15. The system of claim 13, wherein:

the fluid container is positioned within the pressure chamber interior in such a manner that the holding space of the fluid container is fluidically connected to the pressure chamber interior;

the pressure chamber interior is evacuated up to a target negative pressure in such a manner that, due to the fluid coupling, a negative pressure difference initially forms in the pressure chamber interior with respect to the holding space; and the fluid container is fillable by introducing a fluid into the holding space.

* * * * *